(12) United States Patent
Donaldson

(10) Patent No.: US 11,027,304 B2
(45) Date of Patent: Jun. 8, 2021

(54) SYSTEMS AND METHODS FOR FLUID RATIO CONTROL

(71) Applicant: Carlisle Fluid Technologies, Inc., Scottsdale, AZ (US)

(72) Inventor: Eric Julius Donaldson, Saint Paul, MN (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 111 days.

(21) Appl. No.: 16/039,895

(22) Filed: Jul. 19, 2018

(65) Prior Publication Data

US 2019/0022683 A1  Jan. 24, 2019

Related U.S. Application Data

(60) Provisional application No. 62/535,620, filed on Jul. 21, 2017.

(51) Int. Cl.
*B05B 12/14* (2006.01)
*G05D 11/00* (2006.01)
(Continued)

(52) U.S. Cl.
CPC ........ *B05B 12/1418* (2013.01); *B05B 7/1693* (2013.01); *B05B 12/1436* (2013.01); *B05B 12/1445* (2013.01); *F04B 23/02* (2013.01); *F04B 23/04* (2013.01); *F04B 49/065* (2013.01); *F04B 49/106* (2013.01); *F04B 49/20* (2013.01);
(Continued)

(58) Field of Classification Search
CPC .............. B05B 12/1418; B05B 7/1693; B05B 12/1436; B05B 12/1445; B05B 7/0018; B05B 7/0408; B05B 7/2491; B05B 12/085; F16L 53/32; F04B 23/02; F04B 23/04; F04B 49/065; F04B 49/106; F04B 49/20; F04B 2205/09; G05D 11/005; G05D 11/132; G05D 11/135; B01F 15/0416

See application file for complete search history.

(56) References Cited

U.S. PATENT DOCUMENTS 3,627,275 A * 12/1971 Gusmer ................ B29B 7/7433
  366/146
4,285,639 A *  8/1981 Woodring ............. F04C 14/223
  417/218
(Continued)

FOREIGN PATENT DOCUMENTS

WO      2017030829 A1     2/2017

OTHER PUBLICATIONS

PCT International Search Report & Written Opinion for PCT Application No. PCT/US2018/043174 dated Oct. 1, 2018; 12 pgs.

*Primary Examiner* — Mohammad Ali
*Assistant Examiner* — David Earl Ogg
(74) *Attorney, Agent, or Firm* — Peter J. Beardsley

(57) ABSTRACT

A multi-component fluid delivery system includes a first fluid pump and a second fluid pump. The first and the second fluid pumps are not mechanically coupled to each other. The multi-component fluid delivery system further includes a control system comprising a processor configured to derive a slip ratio for the first fluid pump and the second fluid pump. The processor is additionally configured to apply a master-slave motor control to deliver a specified fluid ratio via the first and the second fluid pumps based on the slip ratio.

16 Claims, 3 Drawing Sheets

(51) Int. Cl.
  *B05B 7/16* (2006.01)
  *F04B 23/04* (2006.01)
  *F04B 49/20* (2006.01)
  *F04B 23/02* (2006.01)
  *F16L 53/32* (2018.01)
  *F04B 49/06* (2006.01)
  *F04B 49/10* (2006.01)
  *B05B 7/04* (2006.01)
  *B01F 15/04* (2006.01)
  *B05B 7/00* (2006.01)
  *B05B 7/24* (2006.01)
  *B05B 12/08* (2006.01)
  *G05D 11/13* (2006.01)

(52) U.S. Cl.
  CPC ............ *F16L 53/32* (2018.01); *G05D 11/005* (2013.01); *B01F 15/0416* (2013.01); *B05B 7/0018* (2013.01); *B05B 7/0408* (2013.01); *B05B 7/2491* (2013.01); *B05B 12/085* (2013.01); *F04B 2205/09* (2013.01); *G05D 11/132* (2013.01); *G05D 11/135* (2013.01)

(56) References Cited

U.S. PATENT DOCUMENTS

| | | | |
|---|---|---|---|
| 4,965,713 A * | 10/1990 | Hong | G05B 13/028 700/29 |
| 5,388,761 A | 2/1995 | Langeman | |
| 6,220,747 B1 * | 4/2001 | Gosselin | B01F 15/00253 137/3 |
| 6,375,434 B1 | 4/2002 | Taivalkoski et al. | |
| 7,983,877 B2 * | 7/2011 | Koehl | F04D 15/02 702/185 |
| 9,104,643 B2 * | 8/2015 | DeCusatis | H04L 41/0695 |
| 2012/0282121 A1 | 11/2012 | Kieffer et al. | |

* cited by examiner

SYSTEMS AND METHODS FOR FLUID RATIO CONTROL

CROSS REFERENCE TO RELATED APPLICATIONS

This application claims priority from and the benefit of U.S. Provisional Application Ser. No. 62/535,620, entitled "SYSTEM AND METHOD FOR FLUID RATIO CONTROL," filed Jul. 21, 2017, which is hereby incorporated by reference in its entirety for all purposes.

In multi-component fluid delivery systems, where two or more fluid components or compounds are delivered to an output device or container (e.g. spray gun, mixing chamber, tank, reaction site), a ratio of the fluid component delivery may be used so that process outputs are controlled to intended specifications. An example of desired ratios may be found in two-part Spray Polyurethane Foam (SPF) systems, where the chemistry and mixing process may specify a controlled delivery ratio of two fluid components or compounds (A) and (B) at a 1:1 ratio (by weight or volume). It may be useful to improve fluid ratio control.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a multi-component fluid delivery system includes a first fluid pump and a second fluid pump. The first and the second fluid pumps are not mechanically coupled to each other. The multi-component fluid delivery system further includes a control system comprising a processor configured to derive a slip factor for the first fluid pump and the second fluid pump and a slip ratio between the first fluid pump and second fluid pump. The processor is additionally configured to apply a master-slave motor control to deliver a specified fluid ratio via the first and the second fluid pumps based on the slip ratio.

In a second embodiment, a method includes deriving a slip factor for a first fluid pump and a second fluid pump and a slip ratio between the first fluid pump and second fluid pump, wherein the first the second fluid pumps are included in a multi-component fluid delivery system, and wherein the first and the second fluid pumps are not mechanically coupled to each other. The method further includes applying a master-slave motor control to deliver a specified fluid ratio via the first and the second fluid pumps based on the slip ratio.

In a third embodiment, a tangible, non-transitory, computer-readable medium include instructions that when executed by a processor cause the processor to derive a slip ratio for a first fluid pump and a second fluid pump, wherein the first the second fluid pumps are included in a multi-component fluid delivery system, and wherein the first and the second fluid pumps are not mechanically coupled to each other. The instructions when executed by the processor further cause the processor to provide for a master-slave motor control to deliver a specified fluid ratio via the first and the second fluid pumps based on the slip ratio.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
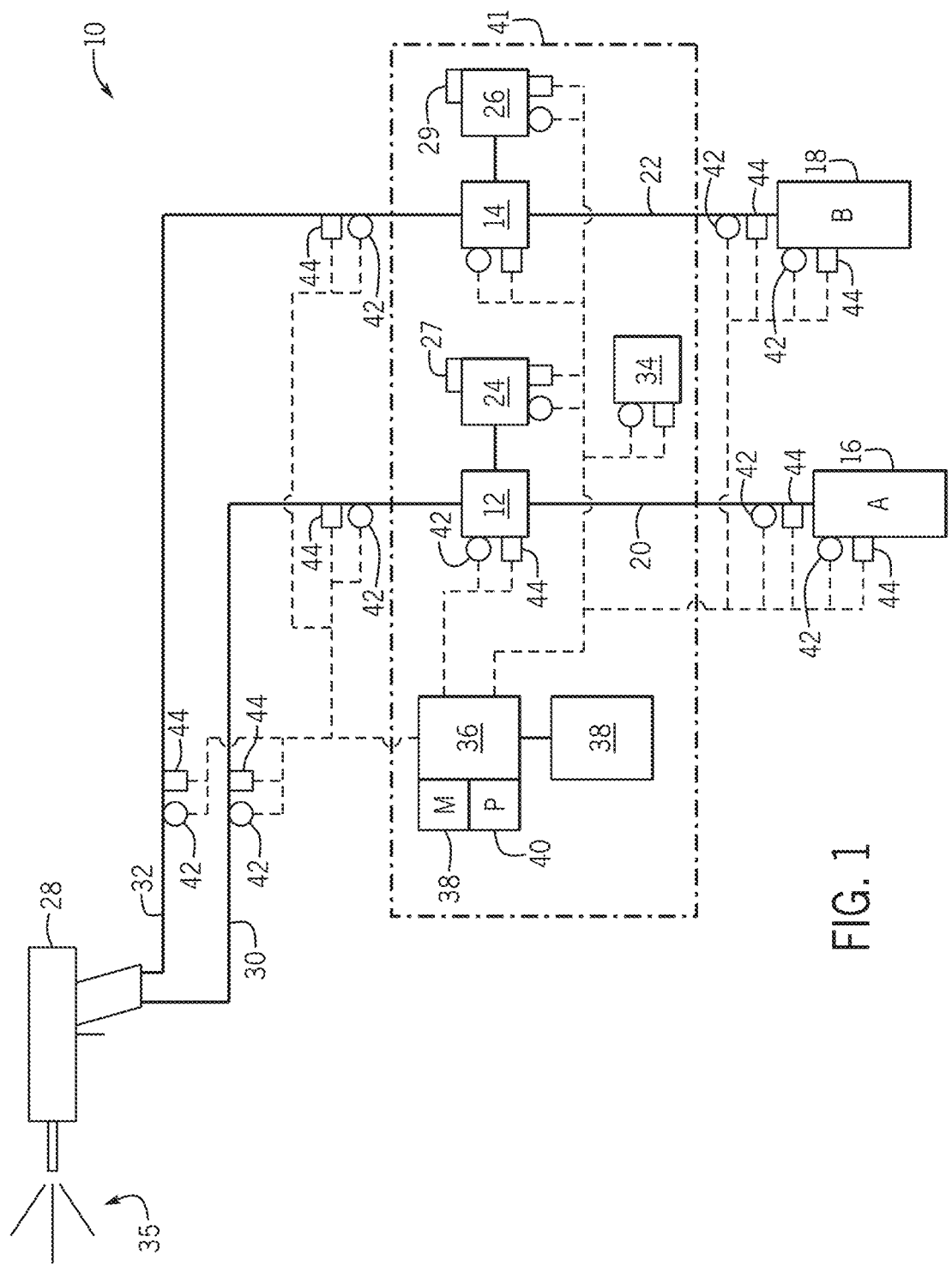
FIG. 1 is block diagram of an embodiment of a spray application system, such as a multi-component fluid delivery system (e.g., SPF system)

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are directed to systems and methods that may improve ratio control for multi-component fluid delivery systems. In multi-component fluid delivery, multiple components or compounds, such as chemical compounds, may be delivered to an output device or container (e.g. spray gun, mixing chamber, tank, reaction site), at specified ratios. For example, for two-part Spray Polyurethane Foam (SPF) systems, the chemistry and mixing process may specify a controlled delivery ratio of two fluid components (compound A) and (compound B) at a 1:1 ratio (by weight or volume). Variations from this ratio may result in lower yield (less insulation value per pound of foam), uncured foam, brittle foam, excessive shrinkage, among other issues.

Certain techniques to provide for multiple fluids that may be used in SPF systems may utilize mechanically coupled (i.e. "yoked") A and B piston pumps of equal displacement to provide a fixed 1:1 delivery ratio. While the using yoked pumps provides for a simple approach, the approach may not account for potential uneven wear (and resulting pump slip) in the A and B pumps that may then cause off-ratio fluid delivery. The yoked pump approach also does not allow for maintaining A and B fluids at different pressures, which may be required to provide uniform pressure for mixing at the point of reaction (in the SPF case, at the spray gun). Pressure differences between the A and B fluids at the gun may also result in poor yield. Pressure differences may also result in a fluid "crossover" situation, wherein the stream of A material "crosses over" into a B orifice within the gun mixing chamber. The crossover may clog the internal orifices and/or mixing chamber within the spray gun, which may then require gun disassembly and cleaning.

The techniques described herein include uncoupled, independently controlled pumps. The pumps may be used, for example, in a multi-component fluid delivery system to deliver the A and B fluids to a spray gun. The independent pumps enable independent pressure and ratio control of two or more fluids, which can be an advantage over "yoked" systems. However, as in yoked systems, the multiple pump approach may be susceptible to ratio imbalance due to differential slip ratio between the pumps in the multi-component fluid delivery system. While actual slip rate of each pump is of interest, it may be more beneficial to control the difference in slip between A and B pumps (e.g., differential slip). To measure and control this differential slip rate, flow meters may be used in a closed loop electronic feedback and motor drive system to compensate for pump slip (and differential slip ratio). Other indirect means of determining slip are described in a separate disclosure. The techniques described herein enable measurement of pump slip and compensation for the differential slip ratio between pumps to provide for a desired output ratio.

The techniques described herein detect a slip or a slip factor in fluid pumps indirectly, as opposed to direct measurements via flowmeters. However, direct measurements may also be used and applied to slip ratio control. Due to design and/or wear characteristics, fluid pumps may experience a reduction in capacity vs. their theoretical volumetric displacement. This reduction is often called the "slip" or "slip factor". Slip may be caused by fluid that "leaks" from higher pressure portions of a pump to lower pressure portions of the pump.

A slip factor of 10%, for example, would indicate that the pump flow rate is only 90% of its theoretical capacity. Slip is generally quite high in centrifugal pumps as compared to positive displacement pumps. Slip is a function of pump speed, geometry, internal clearances between moving and stationary parts, and fluid properties (e.g. viscosity, density, lubricity, temperature). The techniques described herein may detect and measure slip indirectly (e.g., via pressure sensors) as opposed to using direct measures (e.g., via flow meters). Accordingly, the techniques described herein may provide for less invasive measurement in a more cost effective fashion, and may additionally be used with direct measurements, for example, to provide for slip measure redundancy.

It may be useful to describe a system that may apply the ratio control techniques and pump slip or pump slip factor measurements described herein. Accordingly and turning now to FIG. 1, the figure is a block diagram illustrating an embodiment of a spray application system 10 that may include one or more liquid pumps 12, 14. The spray application system 10 may be suitable for mixing and dispensing a variety of chemicals, such as a chemicals used in applying spray foam insulation. In the depicted embodiment, chemical compounds A and B may be stored in tanks 16 and 18, respectively. The tanks 16 and 18 may be fluidly coupled to the pumps 12 and 14 via conduits or hoses 20 and 22. It is to be understood that while the depicted embodiment for the spray application system 10 shows two compounds used for mixing and spraying, other embodiments may use a single compound or 3, 4, 5, 6, 7, 8 or more compounds. The pumps 12 and 14 may be independently controlled.

During operations of the spray application system 10, the pumps 12, 14 may be mechanically powered by motors 24, 26, respectively. In a preferred embodiment, the motors may be electric motors. However, internal combustion engines (e.g., diesel engines), pneumatic motors, or a combination thereof. Motor controllers 27 and 29 may be used to provide for motor start/stop, loading, and control based on signals transmitted, for example, from the processor 40. The motor 24 may be of the same type or of a different type from the motor 26. Likewise, the pump 12 may be of the same type or of different type from the pump 14. Indeed, the techniques described herein may be used with multiple pumps 12, 14, and multiple motors 24, 26, which may be of different types.

The pumps 12, 14 provide for hydrodynamic forces suitable for moving the compounds A, B into a spray gun system 28. More specifically, compound A may traverse the pump 12 through conduit 20 and then through a heated conduit 30 into the spray gun system 28. Likewise, compound B may traverse pump 14 through conduit 22 and then through a heated conduit 32 into the spray gun system 28. To heat the heated conduits 30, 32, a heating system 34 may be provided. The heating system 34 may provide for thermal energy, such as a heated fluid, suitable for pre-heating the compounds A and B before mixing and spraying and for heating the compounds A and B during mixing and spraying.

The spray gun system 28 may include a mixing chamber to mix the compounds A and B. For spray foam insulation applications, the compound A may include isocyanates while the compound B may include polyols, flame retardants, blowing agents, amine or metal catalysts, surfactants, and other chemicals. When mixed, an exothermic chemical reaction occurs and a foam 35 is sprayed onto a target. The foam then provides for insulative properties at various thermal resistance (i.e., R-values) based on the chemicals found in the compounds A and B.

Control for the spray application system 10 may be provided by a control system 36. The control system 36 may include an industrial controller, and thus include a memory 38 and a processor 40. The processor 40 may include multiple microprocessors, one or more "general-purpose" microprocessors, one or more special-purpose microprocessors, one or more application specific integrated circuits (ASICS), and/or one or more reduced instruction set (RISC) processors, or some combination thereof. The memory 38 may include a volatile memory, such as random access memory (RAM), and/or a nonvolatile memory, such as ROM, a hard drive, a memory card, a memory stick (e.g., USB stick) and so on. The memory 38 may include computer programs or instructions executable by the processor 40 and suitable for controlling the spray application system 10. The memory 38 may further include computer programs or instructions executable by the processor 40 and suitable for detecting pump 12, 14 slip and for providing ratio control actions to continue providing as desired ratio (e.g., 1:1) for compounds A and B in the presence of slip, as further described below.

The control system 36 may be communicatively coupled to one or more sensors 42 and operatively coupled to one or more actuators 44. The sensors 42 may include pressure sensors, flow sensors, temperature sensors, chemical composition sensors, speed (e.g., rotary speed, linear speed) sensors, electric measurement sensors (e.g., voltage, amperage, resistance, capacitance, inductance), level (e.g., fluid level) sensors, limit switches, and so on. The actuators 44 may include valves, actuatable switches (e.g., solenoids), positioners, heating elements, and so on.

A user or users may interface with the control system 36 via an input/output (I/O) system 38, which may include touchscreens, displays, keyboards, mice, augmented reality/virtual reality systems, as well as tablets, smartphones, notebooks, and so on. A user may input desired pressures, flow rates, temperatures, ratio between compound A and compound B (e.g., 1:1), alarm thresholds (e.g., threshold fluid levels of compound A, B in tanks 16, 18), and so on.

The user may then spray via the spray gun system 28 and the control system 36 may use the processor 40 to execute one or more programs stored in the memory 38 suitable for sensing system 10 conditions via the sensors 42 and for adjusting various parameters of the system 10 via the actuators 44 based on the user inputs. The I/O system 38 may then display several of the sensed conditions as well as the adjusted parameters. Certain components of the spray application system 10 may be included in or interface with a proportioning system 41. The proportioning system 41 may "proportion" or deliver the compounds A, B at a specified ratio (e.g., 1:1) to achieve the spray 35. In this manner, the user(s) may mix and spray chemicals, such as compounds A and B, to provide for certain coatings, such as insulative spray foam.

As mentioned earlier, the independent pumps 12, 14 may include a certain amount of slip, which may adversely affect the ratio of the compounds A and B going to the spray gun 28 and in the spray 35. It may be beneficial to measure the slip so that the proportioning system 41 may provide ratio adjustments via the control system 38. It is to be understood that while the ratio control and slip sensing techniques described herein are described with respect to the spray application system 10 to provide context, the techniques described herein apply to pump applications in general and may be used by centrifugal pumps, positive displacement pumps, or a combination thereof, in a variety of applications.

Figure 2:
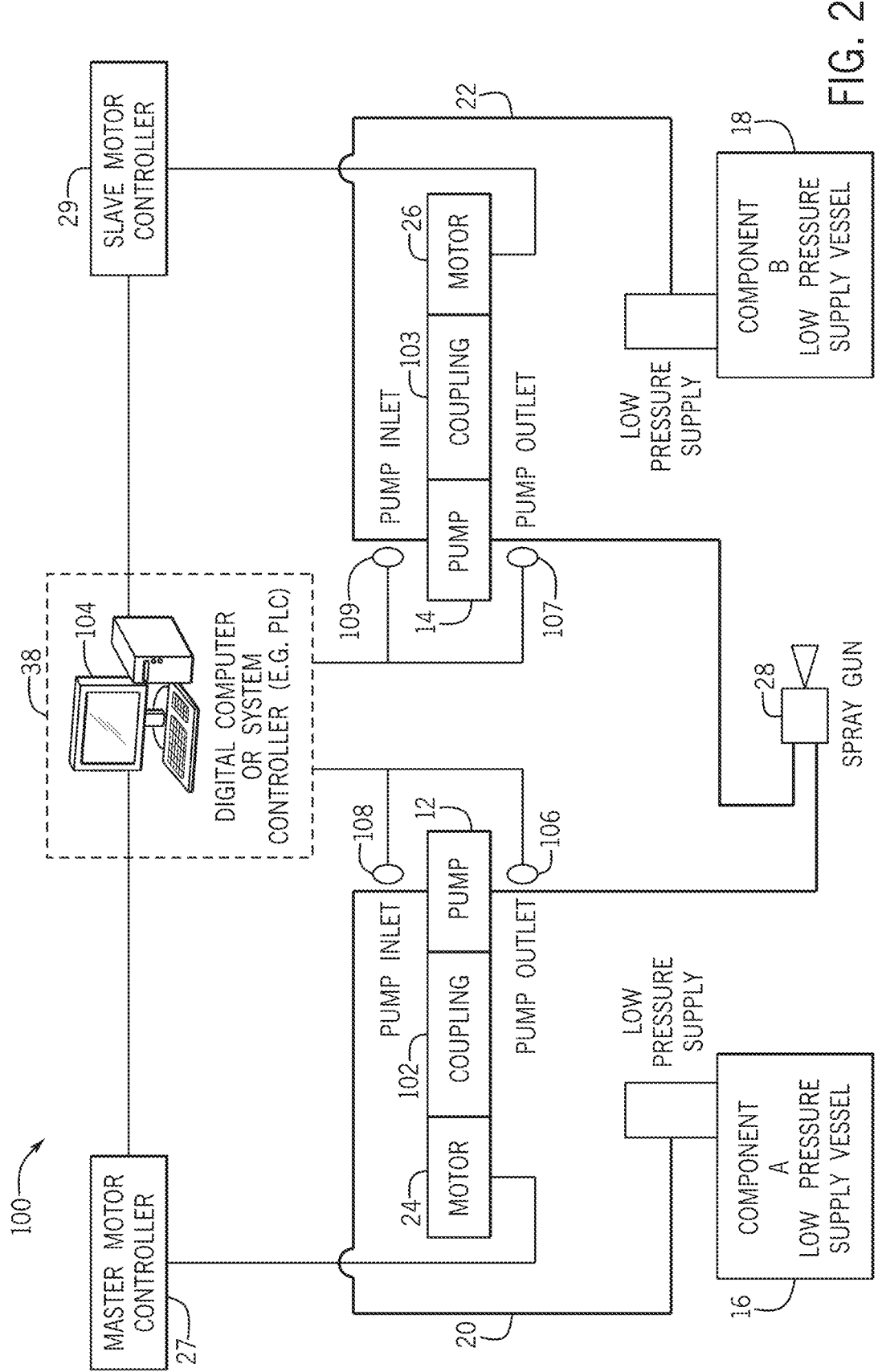
FIG. 2 is block diagram of an embodiment of a fluid system that may be included in the spray application system of FIG. 1.

Turning now to FIG. 2, the figure is a block diagram of an embodiment of a fluid system 100 (e.g., simplified view of the spray application system 10 of FIG. 1) that may provide for detection of pump slip and improved ratio control. Because the figure utilizes like elements to those found in FIG. 1, the like elements are illustrated with like numbers. In the illustrated embodiment, the fluid system 100 includes the pumps 12 and 14 mechanically coupled to motors 24 and 26. In the depicted embodiment, a coupling 102 may mechanically couple the motor 24 to the pump 12 and a coupling 103 may mechanically couple the motor 26 to the pump 16. A pair of motor controllers is also shown, such as motor controllers 27 and 29.

During operations, the control system 38, which may include an industrial controller 104, such as a programmable logic controller (PLC), may issue commands to the motor controllers 27 and 29 to drive the motors 24 and 26, thus engaging the pumps 12 and 14. Fluid (e.g., compound A or compound B) stored in tanks 16 and 18 may then flow through conduit 20 and 22 into the pump 12 or 14. Inlet pressure sensors 106, 107 (e.g., sensors 42 disposed on or near the pumps' inlet) may measure pressure at or near the inlet of the pump 12 and 14, and outlet pressure sensors 108, 109 (e.g., sensors 42 disposed on or near the pumps' outlet) may measure pressure at or near the outlet of the pump 12 and 14. The control system 38 may then determine and measure slip based on signals received from the sensors 106, 107, 108 and 109 without using flow meters or sensors.

For example, the control system 38 may use data from the pressure sensors 106, 107, 108 and 109 to determine the leak rate of the pumps 12 and 14 in a "stalled" state. In this approach, the fluid system 100 is pressurized by the pump 12 or 14 in a closed system state (e.g. high pressure output is occluded, closed, etc.). The pump 12 or 14 is then held in a constant position (linear for piston pumps, angular for rotary pumps). By monitoring the difference between inlet and outlet pressure over time, and by knowing relevant properties of the fluid (e.g., compounds A, B) and pump 12, 14 (e.g., internal volume, size of components, type of components, and so on), the control system 38 may calculate a slip value for each of the pumps 12 and 14. One example calculation is as follows, and derived from orifice flow theory:

$$Q(t) = Pf \times Ff \times \int \Delta P^{1/2} dt \qquad \text{Equation (1)}$$

Where Q=Slip (volume) over sample time period t, Pf=Pump Factor (experimentally measured), Ff=Fluid Factor (experimentally measured), ΔP=Po−Pi, Po=Outlet pressure, and Pi=Inlet pressure.

Both Pf and Ff may be functions of temperature or other factors. The integral over the sampling time would be evaluated either via numerical methods in control software of the control system 38, and/or with digital or analog circuitry. Other theoretical or empirical calculations may be used to determine slip (Q). The calculated Q can then be used to determine slip rate for the initial ΔP or other a numerically derived resultant of ΔP (e.g. average ΔP over the sampling period, etc.).

An alternative technique to the Q(t) calculation of equation 1 involves determining the displacement of the pumps 12 and 14 at a zero-flow pressurized state. In this technique, the pumps 12 and 14 are controlled (e.g., via control system 38) to a given outlet pressure (or ΔP) in a known no-flow (i.e., zero flow) state. If there is slip, the control system 38 will advance the pumps 12 and 14 to maintain the set outlet pressure level (or ΔP). The motion of the pump 12 or 14 during this state, factored by the pump 12 or 14 displacement, can then be used to calculate the slip Q in the desired pump at the known conditions (pressure, temperature, fluid properties). Accordingly, pump slip may be measured without the need to use direct measurements such as flow measurements. By measuring pump slip indirectly, the techniques described herein may provide for a more robust fluid system 100 which may use more reliable and less costly sensors 42.

While the depicted embodiment, illustrates the indirect derivation of slip, slip may also be derived directly, for example by using flow meters to determine slip flow through the pumps 12 and/or 14. For example, to directly measure and then control differential slip rate, flow meters may be used in a closed loop electronic feedback and motor drive system to compensate for pump slip (and differential slip ratio). Indirect techniques of determining slip are described herein. If pump slip is known, then a master-slave arrangement of motor controllers may be used to compensate for the differential slip ratio between pumps 12 and 14 to provide the desired output ratio. Once direct or indirect sensing is used to determine the slip ratio of the independent pumps 12 and 14 and/or slip of each independent pump 12 and 14, ratio control may be used. More specifically, the ratio of slip between the two pumps 12 and 14 is then used in the individual motor drives 27 and 29 to control the speed ratio of the motors 24, 26 to match the slip ratio as derived either directly and/or indirectly. In one embodiment, one pump motor controller 27 or 29 is designated the "master" and the other(s) as "slave(s)". When in operation, the velocity control of the slave motor(s) is/are factored by the slip ratio to the velocity of the master drive. While the master motor may be operating in pressure control mode only, it's encoder signal is used to drive the velocity control loop of the slave drives factored by the slip ratio between the master and slave drives. Thus, when the pumps are in motion, the slave drive may always and continuously be compensated for differential slip between the pumps 12 and 14.

Figure 3:
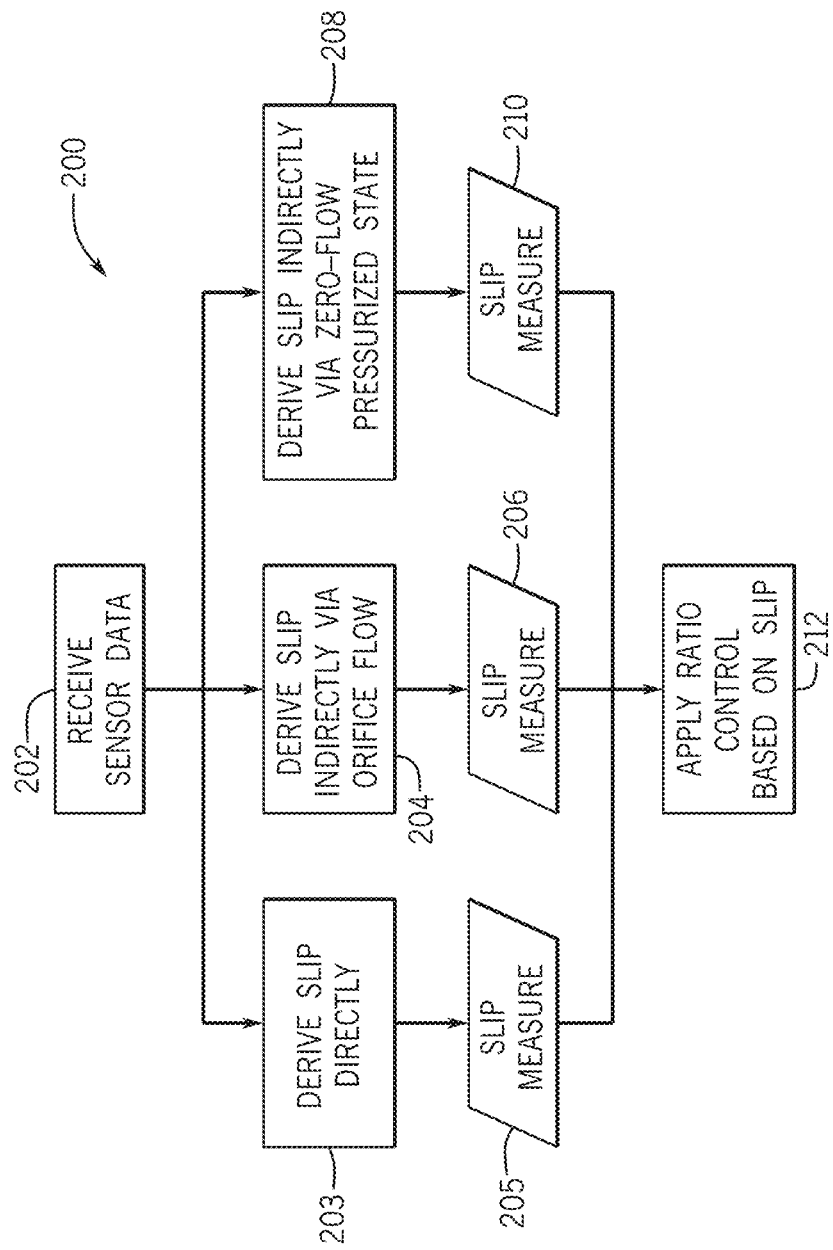
FIG. 3 is a flowchart of an embodiment of a process for slip ratio control of multiple fluids.

FIG. 3 is a flowchart of an embodiment of a process 200 that may be suitable for deriving pump slip ratio and/or individual pump slip and then applying ratio control. The process 200 may be implemented as computer code or instructions stored in them memory 38 and executable by the processor 40. In the depicted embodiment, the process 200 may receive (block 202) data from one or more of the sensors 42, including the pressure sensors 106, 107, 108, and 109. As mentioned earlier, the pressure sensors 106, 107 may be a pump inlet pressure sensors while the pressure sensors 108, 109 may be a pump outlet pressure sensor.

The process 200 may then use the received data to derive (block 203) slip 205 via direct techniques (e.g., flow meters), to derive (block 204) slip 206 via orifice flow derivations and/or to derive (block 208) slip 210 via zero-flow pressurized state techniques. As mentioned earlier, the slip measure 206 may be derived via the equation $Q(t)=Pf \times Ff \times \int \Delta P^{1/2} dt$ using data from pressure sensors 106, 107, 108, 109. Also as mentioned above, the slip measure 210 may be derived by setting the pump 12 and 14 to a no-flow state with an outlet pressure (or $\Delta P$). Slip measure 110 may then be derived base on advancing the pump 12 and 14 to maintain the set outlet pressure in this no-flow state. Slip measures 205, 206, and 210 may include slip ratio and/or individual slip for pumps 12, 14. The slip measure 206 and/or the slip measure 210 may then be used for control (block 212). For example, the control system 36 may apply the master-slave motor control techniques described earlier. For example, the velocity control of the slave motor(s) is/are factored by the slip ratio to the velocity of the master drive. While the master motor may be operating in pressure control mode only, its encoder signal is used to drive the velocity control loop of the slave drives factored by the slip ratio between the master and slave drives. Thus, when the pumps are in motion, the slave drive may always and continuously be compensated for differential slip between the pumps 12 and 14. In this manner, the techniques described herein may provide for more accurate and reliable ratio control of multiple fluids.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A multi-component fluid delivery system, comprising:
 a proportioner system comprising two or more fluid pumps and configured to deliver fluids from the two or more fluid pumps into a spray gun to spray a foam,
 a first fluid pump of the two or more fluid pumps;
 a second fluid pump of the two or more fluid pumps, wherein the first and the second fluid pumps are not mechanically coupled to each other; and
 a first motor controller configured to control the first fluid pump and a second motor controller configured to control the second fluid pump; and
 a control system comprising a processor configured to:
  derive a slip ratio for the first fluid pump and the second fluid pump; and
  apply a master-slave motor control to deliver a specified fluid ratio via the first and the second fluid pumps based on the slip ratio, wherein the slip ratio comprises a differential slip ratio having a difference in slip between the first fluid pump and the second fluid pump, wherein the processor is configured to apply the master-slave motor control by selecting one of the first or the second motor controller as a master controller and the other of the first or the second master controller as a slave controller, wherein both the first motor controller and second motor controller are configured to receive a signal directly from the control system.

2. The system of claim 1, wherein the processor is configured to derive the slip ratio via an indirect measurement, a direct measurement, or a combination thereof.

3. The system of claim 2, wherein the indirect measurement comprises a fluid pressure measurement, and wherein the direct measurement comprises a fluid flow measurement.

4. The system of claim 1, wherein the slip ratio comprises a slip volume Q with $Q(t)=Pf \times Ff \times \int \Delta P^{1/2} dt$ where t comprises a sample time period, Pf=Pump Factor experimentally measured, Ff=Fluid Factor experimentally measured, $\Delta P=Po-Pi$, Po=Outlet pressure, and Pi=Inlet pressure.

5. The system of claim 1, wherein the slip ratio comprises a slip volume Q determined via displacement of the first and the second fluid pumps at a zero-flow pressurized state.

6. The system of claim 1, wherein the processor is configured to apply the master-slave motor control to provide for the same fluid pressure at a first outlet of the first fluid pump and at a second outlet of the second fluid pump.

7. The system of claim 1, wherein the first fluid pump is configured to be fluidly connected to a foam dispensing gun via a first hose at a first hose inlet of the foam dispensing gun, and wherein the second fluid pump is configured to be connected to the foam dispensing gun via a second hose at a second hose inlet of the foam dispending gun, and wherein the processor is configured to apply the master-slave motor control to provide for equal fluid pressure between the first and the second hoses, between the first and the second hose inlets, between the first hose and the second hose inlet, between the second hose and the first hose inlet, or a combination thereof.

8. The system of claim 1, wherein the slave motor controller is configured to control a slave velocity of a slave controller motor drive by factoring the slip ratio to a master velocity of a master controller motor drive.

9. A method, comprising:
 deriving a slip ratio for a first fluid pump and a second fluid pump, wherein the first the second fluid pumps are included in a proportioner system configured to deliver fluids from the first and the second pumps into a spray gun to spray a foam, and wherein the first and the second fluid pumps are not mechanically coupled to each other, wherein a first motor controller configured to control the first fluid pump and a second motor controller configured to control the second fluid pump, wherein the processor is configured to apply the master-slave motor control by selecting one of the first or the second motor controller as a master controller and the other of the first or the second master controller as a slave controller, wherein both the first motor controller and second motor controller are configured to receive a signal directly from a control system; and
 applying a master-slave motor control to deliver a specified fluid ratio via the first and the second fluid pumps based on the slip ratio, wherein the slip ratio comprises a differential slip ratio having a difference in slip between the first fluid pump and the second fluid pump.

10. The method of claim 9, wherein deriving the slip ratio comprises applying an indirect measurement, and wherein the indirect measurement comprises a fluid pressure measurement.

11. The method of claim 9, wherein the slip ratio comprises a slip volume Q with $Q(t)=Pf \times Ff \times \int \Delta P^{1/2} dt$ where t comprises a sample time period, Pf=Pump Factor experimentally measured, Ff=Fluid Factor experimentally measured, $\Delta P=Po-Pi$, Po=Outlet pressure, and Pi=Inlet pressure.

12. The method of claim 9, wherein the slip ratio comprises a slip volume Q determined via displacement of the first and the second fluid pumps at a zero-flow pressurized state.

13. A tangible, non-transitory, computer-readable medium comprising instructions that when executed by a processor cause the processor to:
   derive a slip factor for a first fluid pump and a second fluid pump, wherein the first the second fluid pumps are included in a proportioner system configured to deliver fluids from the first and the second pumps into a spray gun to spray a foam, and wherein the first and the second fluid pumps are not mechanically coupled to each other, wherein a first motor controller is configured to control the first fluid pump and a second motor controller is configured to control the second fluid pump: and
   provide for a master-slave motor control to deliver a specified fluid ratio via the first and the second fluid pumps based on the slip factor, wherein the slip factor comprises a differential slip ratio having a difference in slip between the first fluid pump and the second fluid pump, wherein the processor is configured to apply the master-slave motor control by selecting one of the first or the second motor controller as a master controller and the other of the first or the second master controller as a slave controller, wherein both the first motor controller and second motor controller are configured to receive a signal directly from a control system.

14. The media of claim 13, wherein deriving the slip factor comprises applying an indirect measurement, and wherein the indirect measurement comprises a fluid pressure measurement.

15. The media of claim 13, wherein the slip factor comprises a slip volume Q with $Q(t)=Pf \times Ff \times \int \Delta P^{1/2} dt$ where t comprises a sample time period, Pf=Pump Factor experimentally measured, Ff=Fluid Factor experimentally measured, $\Delta P=Po-Pi$, Po=Outlet pressure, and Pi=Inlet pressure.

16. The media of claim 13, wherein the slip factor comprises a slip volume Q determined via displacement of the first and the second fluid pumps at a zero-flow pressurized state.

* * * * *